United States Patent [19]

Wilson

[11] 4,150,825
[45] Apr. 24, 1979

[54] GOLF GAME SIMULATING APPARATUS

[76] Inventor: Robert F. Wilson, 3363 S. 13th East, Salt Lake City, Utah 84106

[21] Appl. No.: 816,345

[22] Filed: Jul. 18, 1977

[51] Int. Cl.² .......................................... A63B 69/36
[52] U.S. Cl. ........................... 273/185 B; 273/187 R; 273/195 A; 273/181 H; 273/DIG. 28
[58] Field of Search .......... 273/185 R, 185 A, 185 B, 273/184 R, 187 R, 183 A, 186 R

[56] References Cited

U.S. PATENT DOCUMENTS

| 3,408,750 | 11/1968 | McCollough et al. | 273/187 R X |
| 3,563,553 | 2/1971 | Baldwin et al. | 273/185 B X |
| 3,589,732 | 6/1971 | Russell | 273/185 B X |
| 3,655,202 | 4/1972 | Gautraud | 273/184 R X |
| 3,759,528 | 9/1973 | Christophers | 273/185 R X |
| 3,778,064 | 12/1973 | Nutter | 273/185 B X |
| 3,837,655 | 9/1974 | Angelos | 273/185 R |

Primary Examiner—George J. Marlo
Attorney, Agent, or Firm—Criddle, Thorpe & Western

[57] ABSTRACT

Apparatus for simulating the playing of golf includes a tee area from which a player may drive a golf ball toward a curved target screen in front of the tee area. Three arrays of optical sensing devices are positioned to gather data as to the time and horizontal location at which a driven ball passes through each of three corresponding planes spaced apart between the tee area and the screen, and the horizontal location at which the ball rebounds from the screen through the plane closest to the screen. The sensing devices detect the passage of balls through the planes by detecting the reflection of infrared light from the balls. The infrared light is produced by an infrared light source and directed through the space through which the balls travel. A first and second ones of the planes are vertically disposed between the tee area and the screen and a third plane is disposed to extend from near the top of the second plane to near the bottom of the screen. With the data from the sensing devices, computer apparatus produces an estimate for display of the distance of travel and ultimate resting position the driven ball would have if allowed free flight. Use of sensing devices for detecting passage of a driven ball through three different planes and for detecting the rebound angle of the ball from the screen enables determination of the amount of hook or slice a driven ball would have. A television camera is positioned on one side of the tee area, and a grid pattern is positioned on the other side to provide a background and gauge against which movement of a player photographed for instant replay may be measured.

13 Claims, 4 Drawing Figures

GOLF GAME SIMULATING APPARATUS

BACKGROUND OF THE INVENTION

This invention relates to apparatus for simulating the playing of a game of golf.

Numerous arrangements have been proposed for providing indoor facilities by which the playing of an 18-hole, outdoor game of golf can be simulated. Such arrangements are considered desirable for a variety of reasons including alleviating the overcrowding of existing outdoor golf facilities, and enabling year-round play in climates where year-round play at outdoor facilities is not possible. Additionally, the use of indoor facilities would typically be less strenuous and less expensive than would the use of outdoor facilities, and would enhance golf instruction and teaching capabilities.

The arrangements thus far proposed typically include a tee area from which a player may drive a ball and a target screen for receiving the ball and upon which is projected scenes of an actual golf course as viewed from successive locations of the lie of a golf ball looking toward the greens. Various sensing systems are utilized to determine the initial trajectory and speed of the ball, which information is then used to compute an estimate of how far the ball would have traveled had it not struck the target screen. The sensing systems generally employ, either singularly or in combination, photo-electric devices, acoustic pick-up devices or impact-detection devices for determining the path of a driven golf ball. Most often, two sensing devices are used, a first of which detects when the ball leaves a tee point or passes a plane near the tee point, and a second of which is spaced along the line of flight of the ball at a location to detect passage of the ball through that location. The time between detection by the first sensing device and the second sensing device, of course, can be used to ascertain the initial speed of the ball. Additionally, depending upon the nature of the sensing devices, information such as the azimuth and trajectory angle of the ball (with respect to elevation) may be determinable and thereafter used by computing apparatus to compute an estimate of how far the ball would have traveled and the location at which the ball would have come to rest had it not struck the target screen. These estimates are then used to ascertain which scene should be projected on the target screen, with the scene chosen reflecting the estimated lie of the golf ball with respect to the green.

Some exemplary prior art arrangements are disclosed in U.S. Pat. Nos. 3,591,184, 3,778,064, 3,655,202, 3,671,724, 3,712,624 and 3,759,528.

One of the main drawbacks of prior art arrangements has been the costliness of providing apparatus suitable for making calculations of the travel of a golf ball while taking into account such factors as spin of the ball. A drawback of arrangements which have used optical sensing systems has been the distraction that visible light (used with such systems) causes some players. Further, there is a problem with optical sensing systems "falsely" sensing the presence of a ball when no ball has been hit from the tee area. This may be caused, for example, by light being reflected from some foreign object which enters the area between the tee and the target screen. Such false sensing is undesirable since it might result in erroneous computation of the estimated distance of travel of the ball and a premature change of scene projected on the screen.

SUMMARY OF THE INVENTION

It is an object of the invention to provide new and improved apparatus for simulating the playing of golf.

It is another object of the present invention to provide such apparatus which is simple and inexpensive in construction, operation and maintenance.

It is a further object of the present invention to provide such apparatus in which an estimate of the distance of travel and ultimate resting position of a driven golf ball can be accurately made, taking into account the hook or slice of the golf ball.

It is still another object of the present invention to provide such apparatus having an optical sensing system which is not distracting to a player and which accurately discriminates between a driven golf ball and foreign objects or noise.

It is still a further object of the present invention to provide apparatus for photographing a player against a grid pattern background to enable ascertaining movement of the player.

The above and other objects of the invention are realized in a specific illustrative embodiment which includes a support defining a tee area from which a golf ball may be hit, sensor apparatus for detecting the path and speed of travel of a golf ball hit from the tee area, and computing logic responsive to the sensor apparatus for producing an estimate of the distance of travel and ultimate resting position the ball would have had if allowed free flight. The sensor apparatus detects the time and horizontal location at which a ball passes through each of three planes spaced apart in the direction of travel of the ball and from this information the computing logic determines the distance of travel and ultimate resting position of the ball.

In accordance with one aspect of the invention, hook and slice information is determined by detecting, in effect, the angle at which the ball rebounds from the target screen. This is done by detecting the horizontal location at which a ball passes through a plane toward the screen and then the horizontal location at which the ball passes through the same plane after rebounding from the screen.

In accordance with another aspect of the invention, infrared light and infrared light sensing apparatus is utilized to optically sense the travel of the ball from the tee area to the screen. The use of infrared light reduces the distraction that might otherwise be present if visible light were used.

In accordance with still another aspect of the invention, the sensing apparatus of the invention is comprised of an array of photo sensors for receiving light reflected from a driven ball as the ball passes by the array. The photo sensors are spaced apart so that at least two of the photo sensors will be activated when a ball passes by the array.

The computer logic is then adapted to recognize passage of the ball when two (or other selected number) or more adjacent photo sensors have been activated, but to otherwise ignore activation of only a single photo sensor which might, for example, be caused by entry of a foreign object into the area adjacent the array.

Finally, in accordance with still a further object of the invention, a television camera is positioned on one side of the tee area to photograph a player against a grid-pattern background positioned on the other side of the tee area. The grid-pattern background enables better instant-replay analysis of the body movement of a player to thereby facilitate instruction and teaching of the player.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
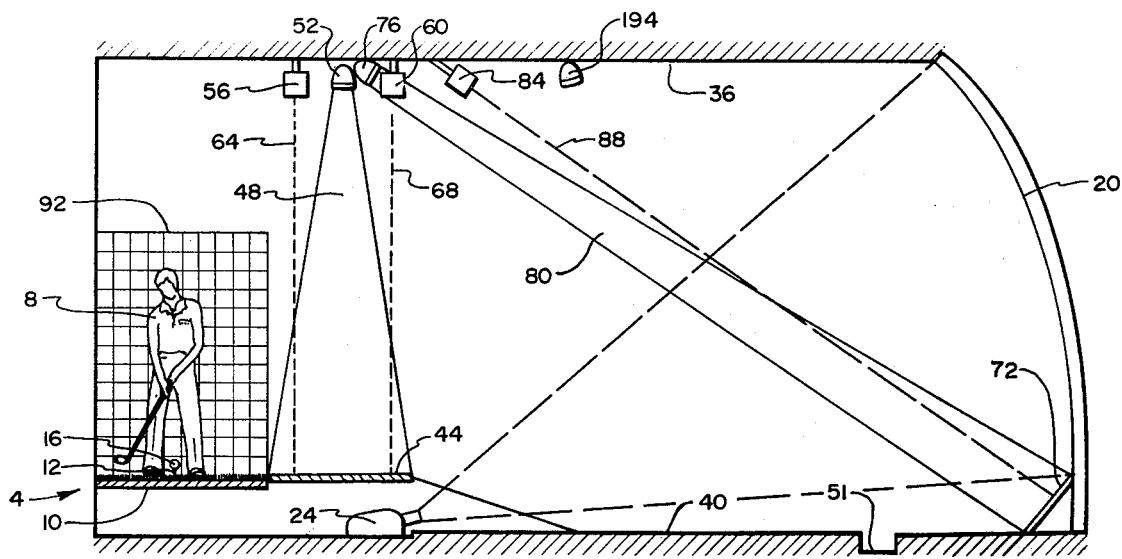
FIG. 1 shows schematically a side-elevational view of apparatus constructed in accordance with the principles of the present invention.
Figure 2:
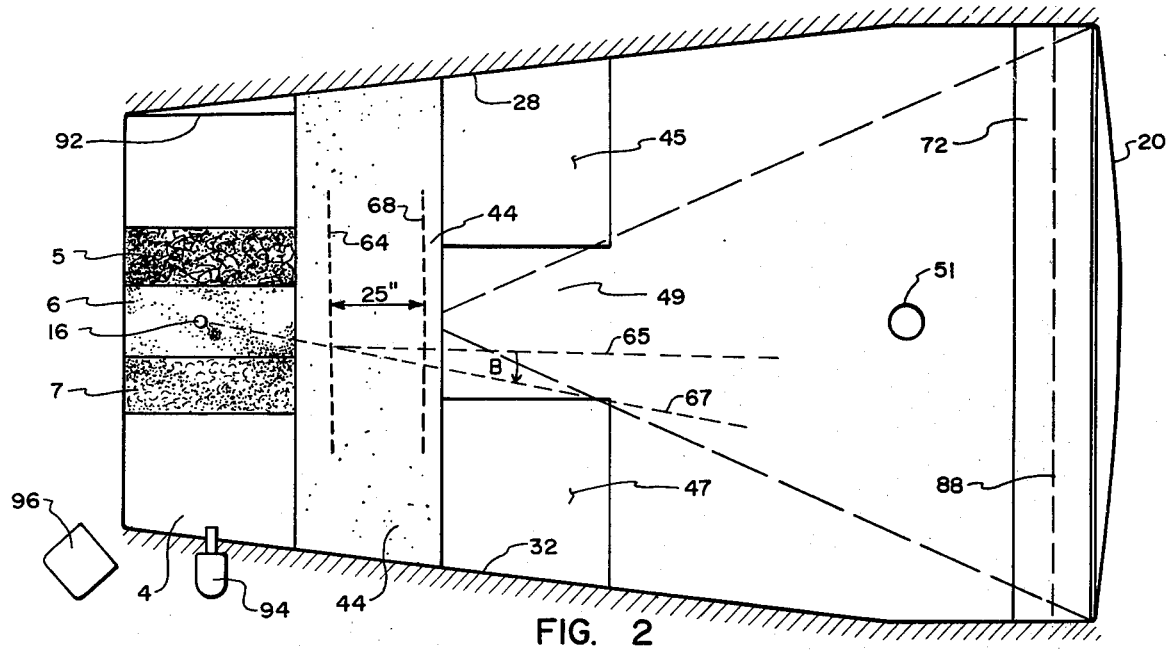
FIG. 2 shows a top plan view of such apparatus.

Referring to FIGS. 1 and 2, there is shown schematically a side, elevational view and a top, plan view respectively of one embodiment of the present invention. Included in this embodiment is a support or platform 4 defining a tee area from which a golf ball may be driven by a player 8 utilizing a golf club. The tee area is divided into three sections 5, 6 and 7, each section being provided with a carpet or other brush-like mat on the upper surface thereof to simulate different outdoor areas from which a golfer might hit a golf ball. For example, section 5 might include a heavy shag carpet to simulate a rough, section 6 a short, tight carpet to simulate a tee area, and section 7 a medium weight carpet to simulate a sand trap. Disposed under the carpet or mat of section 6 is a foam-like material 10 (FIG. 1), known as ethafoam, into which a golf tee 12 may be readily inserted. In other words, a golf tee may be placed anywhere on section 6 (from which a ball 16 is to be hit) simply by inserting the tee through the carpet or mat into the material 10.

Located in front of the tee area is a target screen 20 for receiving balls hit from the tee area and for displaying views projected thereon by a projector 24. The screen 20 is made of a material suitable for absorbing the impact of a driven golf ball and also suitable for displaying an image projected thereon by the projector 24. Reinforced vinyl material suitably tensioned has been found appropriate for this purpose. Alternatively, a target screen constructed similar to that disclosed in the aforecited U.S. Pat. No. 3,591,184, would also be suitable. In either case, the target screen 20 is constructed and positioned so as to cause a driven golf ball to deflect generally downwardly at a speed considerably less than the speed at which the ball strikes the screen.

The screen 20 is also curved in the horizontal direction, as generally shown in FIG. 2, about the center of section 6 of the tee area. That is, the screen 20 forms a segment of a circle whose center is located at the center of section 6 of the tee area. With this configuration, a ball driven from the center of segment 6 (or near thereto) to the screen 20 will rebound back from the screen generally along the approach path, assuming there is no spin on the ball. On the other hand, if there is spin on the ball (which would cause the ball to hook or slice if allowed free flight), this will cause the ball to rebound from the screen 20 at an angle to the approach path and the magnitude and direction of such angle can be used to calculate the amount of hook or slice as will hereafter be described.

Advantageously, the tee area and screen are disposed in an enclosure having a pair of generally vertical side walls 28 and 32 (FIG. 2) and a top wall 36 and bottom wall of floor 40 (FIG. 1). The end of the enclosure at which the tee area is located is open.

Positioned immediately in front of the support 4 is a dark-colored or non-reflecting pad 44 onto which is directed a beam or beams 48 of infrared light from an infrared light source 52 mounted on the top wall 36. The pad 44 is dark colored to provide as much contrast as possible between a white or light-colored golf ball and the area over which the golf ball will travel. The pad 44 should be dimensioned so that a golf ball driven from the tee area will generally pass over a portion of the pad. Extending from the pad 44 toward the screen 20 and sloping downwardly from the pad to the floor 40 are a pair of inclines 45 and 47 separated by a channel 49. The inclines 45 and 47 simulate a putting surface over which a ball may roll from the pad 44 toward a hole 51. The channel 49 is formed to allow projection of scenes by the projector 24 onto the screen 20.

Positioned above the pad 44 on the top wall 36 are a pair of photo sensor arrays 56 and 60. The photo sensor arrays 56 and 60 each include a plurality of sensor elements arranged in a row to receive reflected infrared light in a generally vertical plane in front of the tee area. Photo sensor array 56 receives reflected infrared light in a plane generally indicated by dotted lines 64 (FIG. 2) while the photo sensor array 60 receives reflected infrared light in a generally vertical plane indicated by dotted line 68. As will be explained more fully later, at least three adjacent sensor elements of each photo sensor array will be activated each time a ball passes through the corresponding vertical planes in front of the tee area, with the elements activated being determined by the horizontal location at which the ball passes through the planes. Although the term "planes" is sometimes interpreted to include only flat planes, it should be understood here that the planes could be curved in the horizontal dimension simply by aligning the photo sensor elements in a curve. The term "plane" as used herein should thus be interpreted to mean either a flat or curved locus of lines.

The photo sensor arrays 56 and 60 are directional in that the sensor elements of the arrays are activated only by light traveling to the arrays in the respective planes. An exemplary photo sensor array suitable for use in the present invention is that produced by Reticon Corporation and identified as RL 512C. Advantageously, each photo sensor array 56 and 60 include 512 sensor elements spaced so that at least three of such elements will be activated by light reflected from a ball passing beneath the arrays. Advantageously, the spacing between the two vertical planes defined by the photo sensor arrays 56 and 60 is about 25 inches.

Spaced a distance from the pad 44 and just in front of the target screen 20 is a second dark-colored pad 72. A second infrared light source 76 is mounted on the top wall 36 to direct a beam or beams of infrared light 80 onto the pad 72. The pad 72 extends from near one side wall of the enclosure to near the other side wall thereof, as best seen in FIG. 2, and is oriented at an angle to both the floor 40 and the screen 20. A third photo sensor array 84 is mounted on the top wall 36 to receive a light traveling along a plane generally indicated by dotted lines 88 of FIG. 1. Clearly, this plane is not vertical as are the two planes defined by the photo sensor arrays 56 and 60. The photo sensor array 84 also includes a plurality of sensor elements spaced in a horizontal row to receive light traveling in the plane 88. As the ball passes through the plane 88, again at least three of the sensor elements will be activated, with the particular ones activated being determined by the horizontal location at which the ball passes through the plane. The photo sensor array 84 will detect passage of the ball through the plane 88 as a ball travels toward the target screen 20 and will also detect passage of the ball through the plane 88 as the ball rebounds away from the target screen 20. The horizontal angle of rebound will be determined by the side spin component of the ball which, in turn, determines the amount of hook or slice of the ball. Thus, ascertainment of the angle of rebound of the ball, as previously mentioned, will enable determination of the amount of hook or slice the ball would have and this information is utilized by computing apparatus to determine the ultimate rest position a ball would have if allowed free flight.

Assuming a substantially parabolic trajectory (parabolic except for effect of atmosphere), the following formula can be used to calculate the range of a driven ball from information obtained from the photo sensor arrays 56, 60 and 84:

$$\text{Range} = \frac{K\, d_1\, (d_2 - [T_2\, d_1]/T_1)\, \text{Tan}\, A}{T_1\, \text{Cos}^2 B(T_1 + T_2 + [T_1 d_0]/d_1)},$$

where:

K is a constant chosen so as to match the effect of atmosphere on the trajectory; this can be determined by a skilled player striking a ball from the tee area with a certain club and then adjusting the value of K to give a range corresponding to the range estimated by the skilled player;

$d_0$ is the distance between the tee 12 and plane 64;

$d_1$ is the distance between planes 64 and 68;

$d_2$ is the horizontal distance between the plane 68 and the locus of points where plane 88 meets the pad 72;

$T_1$ is the time of travel of the ball between planes 64 and 68;

$T_2$ is the time of travel of the ball between planes 68 and 88;

A is the angle (in radians) between the plane 88 and the horizontal; and

B is the angle (in radians) between the flight path of the ball and a vertical plane extending perpendicularly with the planes 64 and 68. The angle B is determined according to the horizontal location at which a ball passes through each of the planes 64 or 68. This is, the angle B is determined as the angle between a vertical plane (such as plane 65 of FIG. 2) extending perpendicularly to plane 64 at the point at which the ball passes through the plane 64, and a vertical plane 67 extending coincident with the path of travel of the ball through both planes 64 and 68.

The lateral displacement of a driven ball along the fairway can be calculated as:

Lateral Displacement = (Range) (Sin B) L C, where:

Range is calculated from the previous formula;

L is a constant chosen so as to match the effect of atmosphere on the ball; this can be determined by a skilled player (as with the constant K) striking a ball from the tee area with a golf club and then adjusting the value of L to give a lateral displacement corresponding to the lateral displacement estimated by the skilled player; and C is the angle in radians (horizontal) between the path of incidence and the path of exit of a ball striking and rebounding from the screen 20 (the path of incidence is determined by the horizontal location at which a ball passes through plane 88 toward the screen and the path of exit is determined by the horizontal location at which the ball passes through the plane 88 on its rebound from the screen).

Disposed on the side wall 28, adjacent the tee area is a panel 92 having a grid pattern inscribed on the outer surface thereof (see FIG. 1). The grid pattern provides a background and gauge to facilitate following and analyzing the movement of a player hitting a golf ball as videotaped by a video camera 94. The videotape may be played back on a television screen 96 for viewing by the player and perhaps his instructor. The grid pattern background makes it easy to follow movement of the player's head, shoulders, etc., during his moving so that such movement can be analyzed for instructional purposes.

Figure 3:
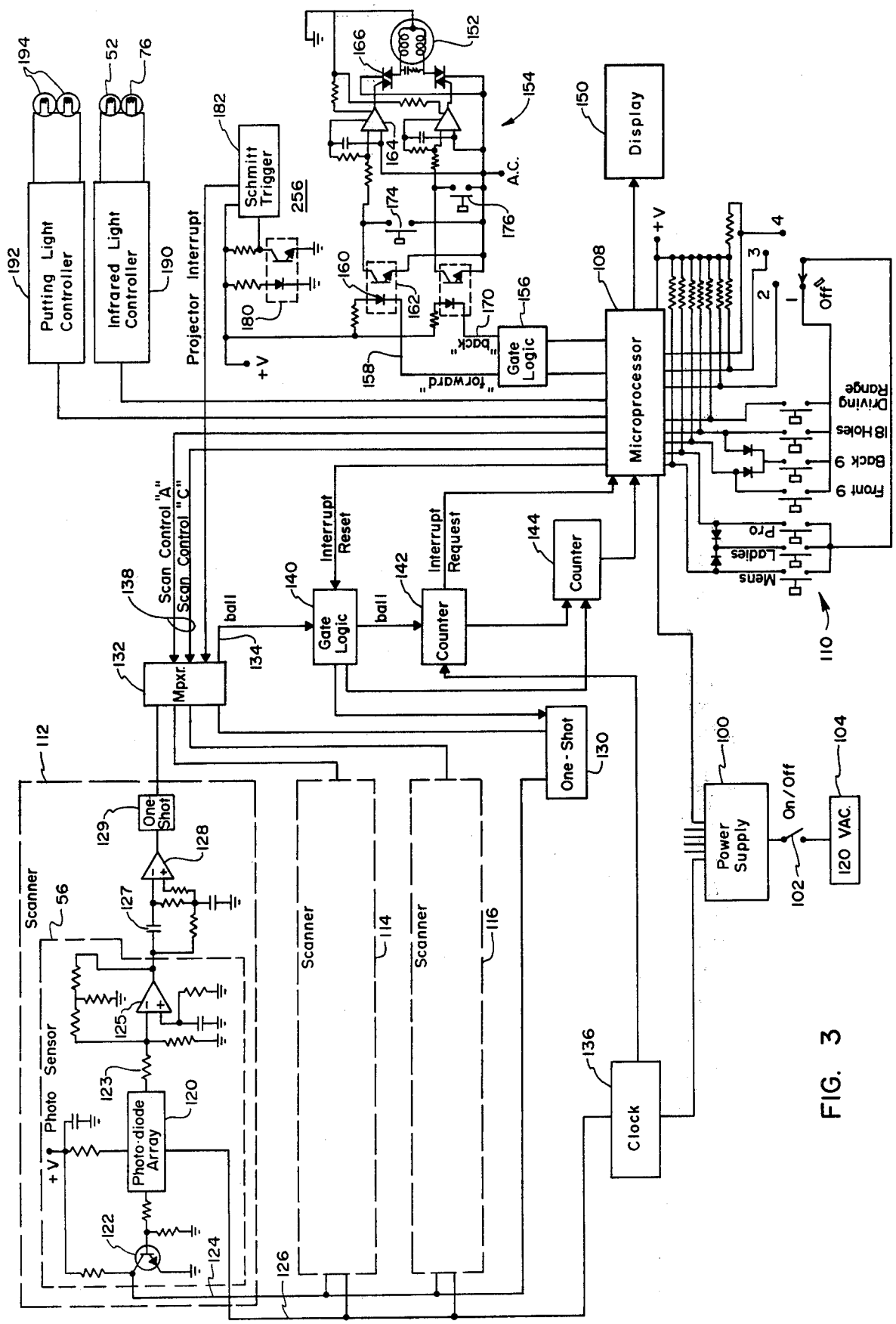
FIG. 3 is a schematic of the sensor, computing circuitry and control circuitry used in the present invention.

Referring to FIG. 3, there is shown a schematic of an illustrative embodiment of scanner, computing, and control circuitry made in accordance with the present invention. The embodiment includes a power supply 100 coupled by way of an on/off switch 102 to an A.C. power source 104. The system of FIG. 3 is initialized by closing the on/off switch 102 which causes power to be supplied to the other components of the system including a computer or microprocessor 108.

The microprocessor 108 is initially "programmed" or conditioned to control operation of the system by a plurality of manually operable switches 110. Operating appropriate ones of the switches conditions the microprocessor 108 to enable simulated playing of either mens, ladies or pro distances and of either the front 9, back 9, all 18 holes or the driving range, and to allow for either 1, 2, 3 or 4 players to play. After the microprocessor 18 is so conditioned by the operation of selected ones of the switches 110, the game may begin. As will be clear from the description which follows, the microprocessor 108 controls the operation of the other circuits of FIG. 3. The microprocessor might illustratively be a Fairchild F-8 unit.

Also included in the system of FIG. 3 are three scanners 112, 114 and 116, each scanner including a photo-sensor such as photo-sensor 56 shown for scanner 112. Only the scanner 112 will be described, but it should be understood that scanners 114 and 116 operate in a similar fashion. The photo-sensor 56 includes a photo-diode array 120 of, for example, 512 individual photo-diodes positioned to scan or view in the plane 64 of FIG. 1 for passage of a golf ball. When power is supplied to the photo-diode array 120, the photo-diodes are activated and the array begins scanning, i.e., producing a serial output indicating the status of the individual photo-diodes. That is, a series of signals are produced at the output of the photo-diode array 120, each signal indicating whether or not a different one of the photo-diodes has detected reflected light from a golf ball (or any object passing in front of the photo-diode). The operation of such a photo-diode array is well known and the array 120 might illustratively be an array produced by Reticon and identified as RL 512 C/17.

At the end of a scan by the photo-diode array 120, the array produces an end-of-scan signal which is applied to the base of a transistor 122 causing the transistor to conduct and thereby apply a signal to lead 124 and to a one-shot multivibrator 130. The one-shot multivibrator 130, in turn, signals a multiplexer 132 to inhibit the multiplexer from applying any signals to the multiplexer's output lead 134. Signals applied to this lead, as will be explained later, indicate either that a ball has been detected or that the projector has moved the film one frame. However, at the end of a scan by the photo-diode array 120, no balls could be detected by the scanner 112 and so to prevent spurious detection of a ball caused by noise, the multiplexer 132 is simply disabled by the one-shot multivibrator 130.

Scanning by the photo-diode array 120 will not begin again until receipt of a start pulse over leads 126 from a clock 136 (although leads 126 are shown as a single lead, it should be understood that a plurality of leads are represented). Start pulses are produced by the clock 136 at regular intervals which are sufficient in length to enable completion of scanning by the photo-diode array 120. Between such start pulses, standard clock pulses are produced as hereinafter described.

Upon receipt of a start signal from the clock 136, the photo-diode array 120 begins a scan, i.e., begins to produce serial output signals indicating the status of the photo-diodes. The rate of scanning by the photo-diode array 120 is controlled by the frequency of a clock signal applied by the clock 136 via leads 126 to the array. The output from the photo-diode array 120 is in the form of a series of pulses, each pulse representing the output of a different one of the photo-diodes. If no light from a golf ball is detected by a photo-diode, a positive pulse is produced, but if reflected light from a golf ball is detected, a negative pulse is produced.

The output signals from the photo-diode array 120 are applied via a resistor 123 to a differential amplifier 125 which amplifies the signals and applies them via a capacitor 127 to the inverting input of another differential amplifier 128. When the signals applied to the inverting input of the amplifier 128 are higher in voltage than a reference voltage applied to the non-inverting input of the amplifier, the amplifier produces an output signal which is applied to a retriggerable one-shot multivibrator 129. Thus, when no ball is detected so that positive pulses are applied by the amplifier 125 to the inverting input of the amplifier 128, output pulses are produced by the amplifier 128 and applied to the one-shot multivibrator 129. When a ball is detected, negative pulses are applied by the amplifier 125 to the amplifier 128 and these negative pulses, being lower than the reference voltage, result in the amplifier 128 not producing any output pulses. As long as output pulses are being applied to the one-shot multivibrator 129, it does not produce any output signal, but if a certain predetermined number of consecutive pulses are not produced by the amplifier 128, the one-shot multivibrator 129 produces an output signal which is applied to the multiplexer 132. The one-shot multivibrator 129, in effect, is reset with each pulse received from the amplifier 128 and when a certain predetermined number of consecutive pulses are not received, the one-shot multivibrator times out and applies a signal to the multiplexer 132.

In a manner similar to that described above, the other scanners 114 and 116 operate to scan or "look" in the planes 68 and 88 (FIGS. 1 and 2) respectively for passage of a golf ball. This scanning takes place simultaneously. When a ball is detected by the scanners, they apply a signal indicating this to the multiplexer 132.

The multiplexer 132 is controlled by the microprocessor 108, and specifically by signals received over leads 138, to apply to a gate logic circuit 140 the signals from the scanners 112, 114 and 116 and from a Schmitt trigger 182 (to be discussed later). Initially, the multiplexer 132 is caused to connect the output of scanner 112 to the gate logic circuit 140. When an output signal is produced by the scanner 112 indicating that a ball has been detected, the microprocessor 108 is signalled accordingly (in a manner to be discussed momentarily) and then causes the multiplexer 132 to connect the output of the next scanner 114 to the gate logic circuit 140. If no output signal is produced by the scanner 114 (indicating that no ball has been detected) within a certain predetermined period of time, then the microprocessor 108 signals the multiplexer 132 to again connect the output of scanner 112 to the gate logic circuit 140. If, on the other hand, scanner 114 does produce an output signal within the predetermined period of time, then the microprocessor 108 is signalled accordingly and it then signals the multiplexer 132 to connect the output of scanner 116 to the gate logic circuit 140. Again, if no output is produced by the scanner 116 within a predetermined period of time, the multiplexer 132 is caused to start over by connecting the output of scanner 112 to the gate logic circuit 140. Failure to produce an output by either scanner 114 or scanner 116 would indicate that a false detection of a ball had been produced by the preceding scanner.

If scanner 116 does produce an output, the microprocessor 108 is so signalled and the microprocessor causes the multiplexer 132 to maintain the connection between the output of scanner 116 and the gate logic circuit. The reason for this is so that information as to the rebound angle of the ball from the screen, as detected by the scanner 116, can be applied to the microprocessor 108. When such information is received, the microprocessor 108 again causes the multiplexer 132 to connect the output of scanner 112 to the gate logic circuit 140.

The above discussion concerned only the connection of the scanners to the gate logic circuit 140, but it should be understood that when the microprocessor 108 is controlling operation of the projector, the multiplexer 132 is caused to connect the output from the Schmitt trigger 182 to the gate logic circuit 140. This will be discussed at the time the projector control circuitry is described.

After the beginning of a scan by the scanners 112, 114, and 116, the clock pulses from clock 136 are divided by two and applied to a counter 142 each time the output from the photo-diode array 120 is advanced to the next photo-diode. That is, for every two photo-diode output pulses produced by the photo-diode array 120, the clock 136 pulses the counter 142 once. The counter 142, in turn, pulses a counter 144 once for every pulse received from the clock 136. The counter 144 maintains a count corresponding to the photo-diode in the photo-diode array 120 (and also in the photo-diode arrays of scanners 114 and 116) which is producing an output therefrom. The counter 144 thus counts from zero to 255 (assuming that the photo-diode arrays each contain 512 photo-diodes), with each count representing a different pair of the photo-diodes of the scanners 112, 114, and 116. When scanner 112 produces an output indicating that a ball has been detected, and this output is applied by the multiplexer 132 to the gate logic circuit 140, the gate logic circuit applies a signal to the counter 142 to stop the counter from further applying pulses to the counter 144. The counter 142 also signals the microprocessor 108 that a ball has been detected and the microprocessor 108 reads out the contents of the counter 144 to thereby identify which elements or photo-diodes of the corresponding scanner "saw" a ball. Since several adjacent photo-diodes must be energized by reflected light before the one-shot multivibrator 129 is caused to produce an output, the photo-diode identified by the counter 144 would be the last photo-diode in the array to be energized when the one-shot multivibrator 129 is caused to produce its output. In this manner, the microprocessor 108 is informed of the elements or photo-diodes of each array which are activated by the passage of a ball in front of that array.

After the count is read from the counter 144, the microprocessor 108 signals the gate logic circuit 140 to reset the circuit and the gate logic circuit, in turn, signals the one-shot multivibrator 130 to reset it so that it removes the inhibit signal being applied to the multiplexer 132. The gate logic circuit 140 also resets the counter 144.

As before indicated, when a ball is detected by the scanner 112, the microprocessor 108 begins to time over a predetermined period until either a ball is detected by the next scanner 114 or the microprocessor 108 times out, whichever occurs first. If a ball is detected by scanner 114, the time between detection by scanner 112 and scanner 114 is measured by the microprocessor 108 for subsequent use in the formula for calculating the range of the ball, previously set forth. If scanner 116 also detects the ball, the microprocessor 108 notes the time between detection by scanner 114 and scanner 116 also for use in the range formula. The angle B is determined by the microprocessor 108 from the photo-diodes of the arrays which are activated by the ball. From this information, the microprocessor 108 computes the distance the ball would have traveled if allowed free flight and the lateral displacement of the ball, taking into account the hook and slice of the ball. The distance the ball would have traveled is then displayed on a display device 150 for viewing by the players.

After one player has hit a ball, the microprocessor 108 signals the display unit 150 to identify the next player which is to hit the ball. After all players who are playing have hit the ball from the tee area, the microprocessor 108 controls the operation of a projector motor 152 to advance the frames of the film in the projector to show a scene of the golf green from a point near where the ball farthest from the green would have landed as determined by the microprocessor from the range and lateral displacement information. In other words, a scene is projected on the screen 20 (FIGS. 1 and 2) showing the golf green from near the location at which the player's ball farthest from the green would have landed as calculated by the microprocessor. That player is then identified on the display 150 as being the next player which is to hit the ball from the tee area toward the screen and after the player does hit the ball, the microprocessor 108 again controls the projector motor 152 to advance or otherwise move the film to show the view of the green from the point at which the ball second farthest from the green came to rest. In this manner, the microprocessor 108 calculates the distance traveled by the ball struck by the players and indicates the order in which the players are to hit as well as controlling the scene being displayed on the screen. The display device 150 might illustratively be a conventional digital LED display.

Multiple scenes of each golf green taken from different distances and lateral displacements are provided on the film to closely simulate the views of the greens from different lies of a ball. This technique of providing different scenes depending upon where a ball is determined to come to rest is known.

Figure 4:
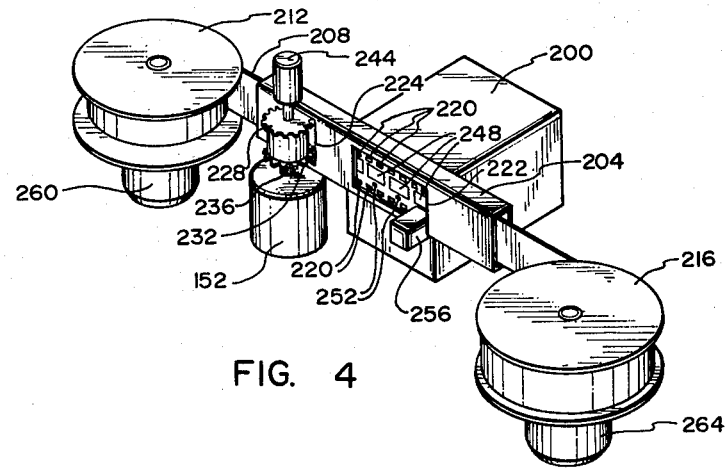
FIG. 4 is a perspective view of illustrative projection apparatus suitable for use with the present invention.

An exemplary projector is shown in FIG. 4 and will now be described, after which the control circuitry of FIG. 3 for controlling the projector will be described. Referring to FIG. 4, there is shown a housing 200 in which is disposed a projector lamp. Positioned in front of the housing 200 is a film guide 204 formed generally in the shape of an elongate, rectangular conduit open at either end thereof. Film 208 from a film reel 212 is fed in one end of the guide 204 in front of the lamp housing 200 and out the other end of the guide to be wound on a second reel 216. An opening 222 is located in the front wall of the film guide 204 and a similar opening is located in the back wall (not shown in FIG. 4) to allow light to pass from the housing 200 through the film 208 positioned between the two openings. Another opening 224 is located near the input end of the film guide 204 to allow access to and engagement with the film by a pair of sprockets 228 and 232. The sprockets 228 and 232 are mounted on a shaft 236 of a motor 152. A knob 244 is mounted on the top of the shaft to allow manual rotation of the shaft. The sprockets 228 and 232 engage respective sprocket holes 220 in the film 208 to cause the film to either advance or back up depending upon the direction of rotation of the shaft 236 by the motor 152. The film, of course, includes a plurality of frames 248, each of which is a different scene of an exemplary golf course as previously described.

The positioning of the drive sprockets 228 and 232 in relation to the film guide 204 prevents the film 208 from buckling or bending when being moved either forward or backward. It also serves to maintain appropriate positioning of the film with respect to the projector lamp and other optical equipment.

Located on the film 208 adjacent each frame is a film spot 252 which passes in front of an optical sensor 256 as the film is moved to enable the optical sensor to count the number of frames the film is either advanced or backed up. The optical sensor 256 operates in a conventional manner by simply detecting light passing through the film spot 252 when the film spot passes in front of the sensor. Two tension motors 260 and 264 are coupled to the reels 212 and 216 respectively to maintain a tension on the film 208 and prevent slack from developing in the film.

Not shown in FIG. 4 is the lens system of the projector which would, of course, be located in front of the film 208 and the housing 200 to appropriately focus the pictures on the screen.

Returning to FIG. 3, the projector control circuitry is generally shown at 154. This circuitry includes a gate logic circuit 156 responsive to the microprocessor 108 to produce either a "forward" signal, a "backup" signal or a neutral signal. The "forward" signal causes the projector to advance the film in a forward direction, the "backup" signal causes the projector to move the film backward, and the neutral signal causes the projector to maintain the film stationary. The "forward" signal produced by the gate logic circuit 156 is applied via a lead 158 to a light-emitting diode 160 of an optically-coupled photo-cell detector 162. Current is thus conducted by the diode 160 causing the transistor of the detector 162 to conduct and thereby cause an operational amplifier 164 to apply a control signal to the gate lead of a triac 166. Application of the control signal to the triac 166 causes the triac to conduct and thereby energize the "forward" winding of the motor 152. This causes the motor to advance the film in the projector in a forward direction. Application of a "backup" signal to a lead 170 results in the energization of the "backup" winding of the motor 152 causing the motor to reverse the direction of movement of film in the projector.

Switches 174 and 176 are provided to allow manual override of the microprocessor 108. Thus, when switch 174 is closed, the motor 152 is caused to advance the film in the projector, and when switch 176 is closed, the motor is caused to back up the film.

Each frame of the film which moves through the projector is counted by the optical sensor 256 which includes an optically-coupled photocell detector 180 and a Schmitt trigger 182. The film is passed between the diode and transistor of the detector 180 so that the transistor is caused to conduct each time a film spot corresponding to a frame passes between the diode and transistor. When the transistor conducts, the Schmitt trigger 182 is caused to produce a pulse which is applied to the multiplexer 132. The microprocessor 108 controls the multiplexer 132 to pass this pulse to the gate logic circuit 140 which, in turn, signals the counter 142. The counter then signals the microprocessor 108 indicating that another frame has moved through the projector. In this manner, the microprocessor 108 maintains a record of which frame is presently being displayed by the projector and when the projector has either advanced or reversed the film the desired number of frames, the microprocessor signals the gate logic circuit 156 to produce a neutral signal so that no further movement of the film is possible.

The microprocessor 108 also controls an infrared light controller 190 and a putting light controller 192. The infrared light controller 190 is caused to activate infrared lamps 52 and 76 previously described in connection with FIG. 1, and the putting light controller 192 is caused to activate lamps 194 (FIG. 1) for illuminating the area around the cup 51 when the microprocessor 108 determines that the players have reached the golf green and are ready to putt. In other words, the microprocessor 108 automatically activates the infrared light controller when the players are still hitting their balls toward the green and automatically activates the putting light controller 192 when the players have reached the green.

In the manner described, apparatus is adapted for simulating the playing of golf by from one to four players. The players drive the golf ball towards a target screen from a tee area and the apparatus automatically calculates the distance the ball would have traveled had it been allowed free flight and then displays this distance on a display unit for viewing by the players. Also, a projector is automatically controlled to display different scenes of the golf green depending upon the distance the golf balls have been hit by the players. The hook or slice of the ball by the players is automatically taken into account in determining the lateral displacement of the ball. The ball detection equipment is especially immune from false detection of balls by provision of the use of infrared light and infrared light photo-detectors. Control of the system is carried out by an appropriately programmed microprocessor.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. For example, although linear, one-dimensional arrays of photo-diodes have been described, two-dimensional arrays could also be employed to "track" a ball substantially through its entire flight.

What is claimed is:

1. Apparatus for simulating the playing of golf comprising
    a support defining a tee area from which a golf ball may be driven by a player utilizing a golf club,
    sensor means for detecting the time and horizontal location at which a driven ball passes through each of three planes spaced apart in the direction of travel of the ball, and
    logic means responsive to said sensor means for producing an estimate of the distance of travel and ultimate resting position the driven ball would have if allowed free flight.

2. Apparatus as in claim 1 further including light means for directing light through the space through which a ball will travel when driven from the tee area, and wherein said sensor means includes three arrays of photosensors, each for receiving light reflected from a driven ball as it passes through a corresponding one of said planes, and for producing a ball-indication signal upon receipt of such light.

3. Apparatus as in claim 2 wherein each of said arrays include a plurality of photosensors positioned generally in a row to be activated by reflected light from a driven ball, said photosensors being dimensioned and spaced apart a distance to cause at least two adjacent sensors to be activated by light reflected from a ball.

4. Apparatus as in claim 3 wherein said light means is disposed above the space through which a ball will travel so as to direct light downwardly to three areas spaced apart in front of the tee area and over which a driven ball will travel, and wherein said arrays of photosensors are disposed generally adjacent the light means, each for receiving reflected light from the direction of a different one of said areas.

5. Apparatus as in claim 4 wherein said light means is adapted to produce infrared light, wherein said arrays of photosensors are adapted to detect infrared light, and wherein said three areas include dark coloring on the upper surfaces thereof to provide contrast with the ball and to minimize reflection of infrared light.

6. Apparatus as in claim 2 wherein said logic means is adapted to produce said estimate only when all of the arrays of photosensors receive light within a predetermined period of time of one another.

7. Apparatus as in claim 6 further including a target screen disposed in front of the tee area for receiving balls driven from the tee area and from which balls will rebound, wherein first and second ones of said planes are vertically disposed between the tee area and screen and generally in parallel with each other, wherein a third one of said planes is disposed to extend from near the top of said second plane to near the bottom of said screen, and wherein said screen is curved in the horizontal direction about a point located in the tee area.

8. Apparatus as in claim 7 wherein the array of photosensors for receiving light in said third plane is adapted to produce a first ball-indication signal as a ball passes through the third plane to the screen and a second ball-indication signal as the ball rebounds from the screen through the third plane, and wherein said logic means is responsive to said first and second ball-indication signals for producing an estimate of the lateral displacement of the ball if the ball were allowed free flight.

9. Apparatus as in claim 1 further including
   a target screen disposed in front of the tee area for receiving balls driven from the tee area,
   projector means positioned to project images from changeable film frames onto the target screen for viewing by the player,
   film frames for said projector means, each frame having a scene of a golf hole taken from a different location spaced from the golf hole, and
   wherein said logic means is adapted to signal said projector means to project a scene representative of the location nearest the position the logic means estimated the driven ball came to rest.

10. Apparatus as in claim 9 wherein said projector means includes
    a lamp housing for containing a lamp and having an opening in one end thereof through which light may pass,
    a film guide disposed adjacent the lamp housing over said opening and comprising an elongate, generally rectangular casing open at both ends thereof to allow the threading of film through the casing, said casing having first and second openings in opposite sides thereof, said openings being positioned contiguous to the opening in the lamp housing to enable light to pass through the casing and thus through film threaded in the casing, said casing having a third opening near one end thereof,
    sprocket means disposed adjacent the film guide to drivingly engage through said third opening film threaded through said casing, and
    means for driving said sprocket means to thereby cause the film to move through the casing.

11. Apparatus as in claim 1 wherein said tee area includes first, second and third sections disposed side by side, said first section including a heavy-weight brush-like mat on the upper surface thereof, said second section including a medium-weight brush-like mat on the upper surface thereof, and said third section including a light-weight brush-like mat on the upper surface thereof.

12. Apparatus as in claim 11 further including a foam material disposed under each of said sections and into which golf tees may be inserted.

13. Apparatus as in claim 1 further including
    a generally vertically-disposed panel positioned on one side of the tee area, the surface adjacent said tee area having inscribed thereon a grid pattern,
    a video camera positioned on the other side of said tee area for video taping against the background of said grid pattern, the movement of a player driving a golf ball, and
    a video receiver and screen for playing back the video-taped information.

* * * * *